United States Patent

[11] 3,623,592

[72] Inventor Earl R. Anderson
 Los Gatos, Calif.
[21] Appl. No. 748,134
[22] Filed July 18, 1968
[45] Patented Nov. 30, 1971
[73] Assignee Brex Corp.
 Los Gatos, Calif.

[54] FRUIT FEED SYSTEM AND METHOD
 11 Claims, 12 Drawing Figs.
[52] U.S. Cl. .................................................... 198/30, 198/25
[51] Int. Cl. ........................................................ B65g 47/26
[50] Field of Search .......................................... 198/30, 22, 24, 33, 31, 32

[56] References Cited
 UNITED STATES PATENTS

| | | | |
|---|---|---|---|
| 2,699,253 | 1/1955 | Miller | 209/104 |
| 2,879,888 | 3/1959 | Miller | 209/104 |
| 3,179,230 | 4/1965 | Brown | 198/30 |
| 3,153,472 | 10/1964 | Mason | 198/31 AA |
| 3,400,803 | 9/1968 | Lanore | 198/31 AA |
| 3,497,052 | 2/1970 | Willsey | 198/33 |

Primary Examiner—Evon C. Blunk
Assistant Examiner—Alfred N. Goodman
Attorney—Allen and Chromy ABSTRACT: A fruit feed system comprising a bulk supply conveyor for rollable fruit articles from which fruit is fed through a discharge opening past a bridge preventing means into an inclined hopper or tray. A row of fruit is elevated from this tray and presented to a selective fruit admitting and rejecting mechanism comprising wobble plates which reject any fruit in the row presented to it which is not properly aligned with one of the passages through the wobble plate system, and admits only one fruit between each pair of wobble plates for feeding thereby on demand to the feed end of one of a plurality of single-file fruit feed mechanisms which incorporate means for feeding one fruit at a time from the discharge end thereof to a suitable processing mechanism such as a grader, a pitter or the like. Means is provided for selectively blocking any one of the single-file feed mechanisms, and when this occurs, the fruit is maintained in the row in an agitated condition, and the fruit between the wobble plates remain in place in agitated condition, ready to feed on demand. Subsequent fruit is presented repeatedly to the wobble plates for admission but no feed occurs when no fruit is in demand. The system includes means for determining the beginning of operation of the wobble plates, and optionally selecting the amount of "wobble" provided by oscillation of the wobble control means.

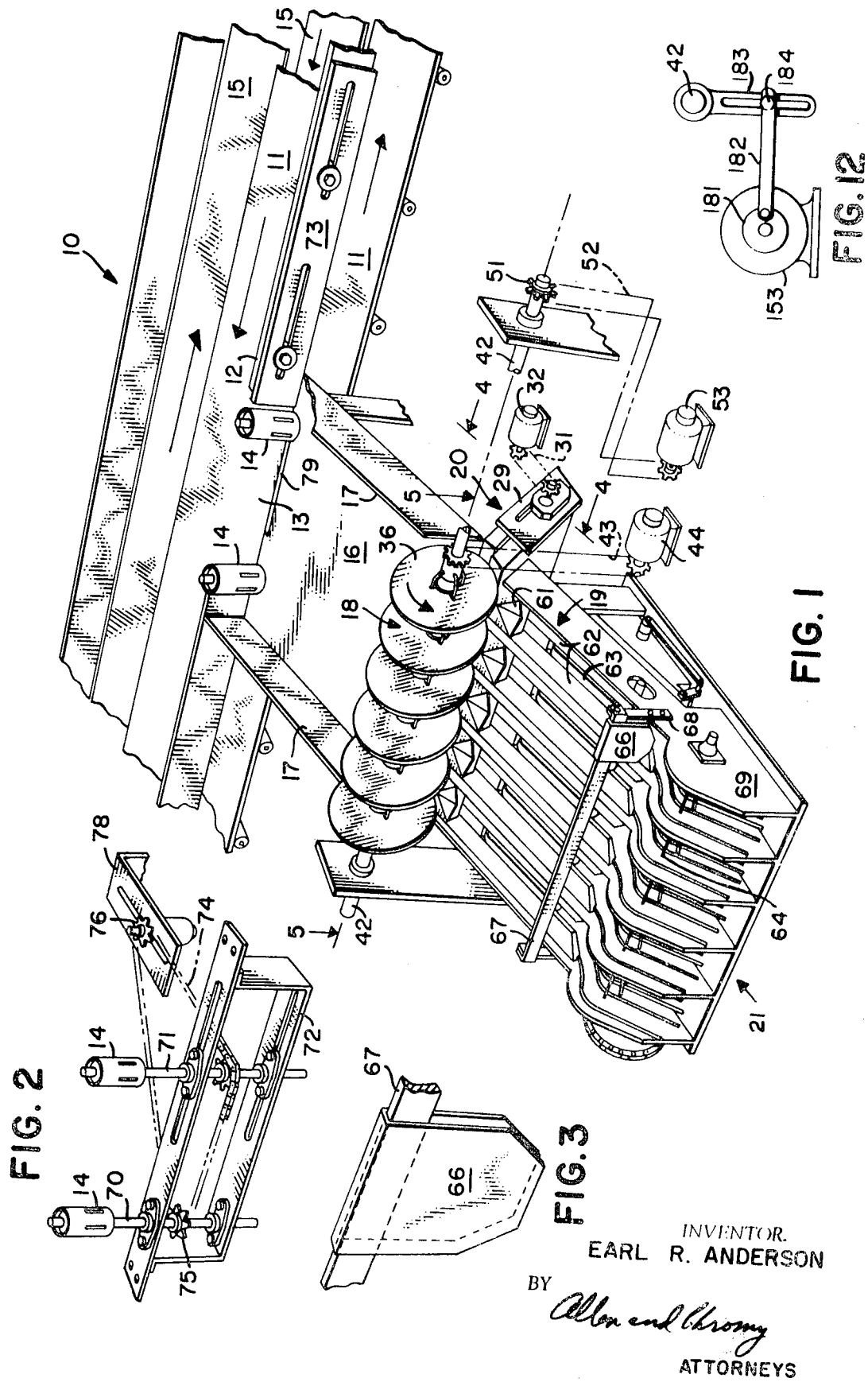

INVENTOR.
EARL R. ANDERSON
BY
ATTORNEYS

PATENTED NOV 30 1971

INVENTOR.
EARL R. ANDERSON

BY
Allen and Throny
ATTORNEYS

FRUIT FEED SYSTEM AND METHOD

DESCRIPTION OF THE INVENTION

In the feeding of field run fruit to one or a plurality of processing mechanisms of various characters, such as graders or pitters, it is desirable that the fruit be fed only on demand, from a bulk supply to the single-file feed mechanisms, and that this fruit be maintained in agitated condition so as to always be ready to feed, but to feed only in response to a requirement for the presence of an additional fruit in a line.

Accordingly, it is a general object of this invention to provide a fruit feed system wherein fruit is received from a bulk supply, is presented to the entrance end of each of a parallel series of single-file feed mechanisms and will be fed to these feed mechanisms only on demand.

A further object of the invention is to provide a fruit feed system of the above character in which the fruit is fed from bulk in a row and only one fruit to a single file feed mechanism is allowed to be fed from this row into the system.

A further object of the invention is to provide means for agitating the fruit at each critical stage of its feed so that the fruit will always be ready to move in response to requirement for a supply of fruit.

Still another object of the invention is to provide an entrance opening from a bulk feed supply of fruit which has automatically operable means for preventing bridging of the opening by a row of fruit.

Still another object of the invention is to provide a fruit-feeding method wherein the fruit is fed in excess in a row to a fruit feeding and rejecting mechanism so that one fruit only is fed to each single-file of fruit for selective feeding one by one.

A still further object of the invention is to provide a method of feeding fruit to a single-file fruit-feeding mechanism only on demand of the single-file for more fruit.

Other objects and advantages of the invention will be apparent from the following description of a preferred embodiment thereof, made with reference to the accompanying drawings, in which:

FIG. 1 is a schematic perspective view of the fruit feed system;

FIG. 2 is a schematic perspective view of the drive for the antibridging means;

FIG. 3 is a perspective view showing the means for selectively blocking the feed of fruit through a particular single-file feed mechanism;

Figure 4:
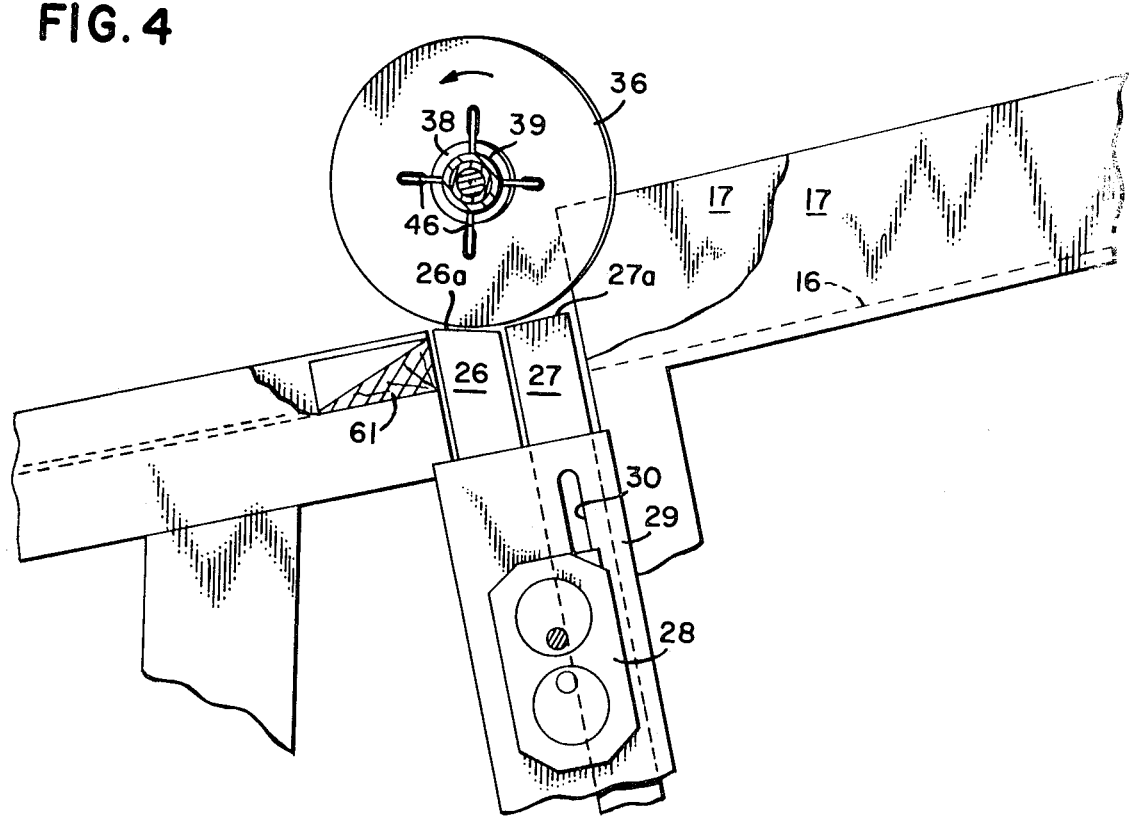
FIG. 4 is a sectional view, partially in elevation, taken in a plane indicated by the line 4—4 of FIG. 1.
Figure 6:
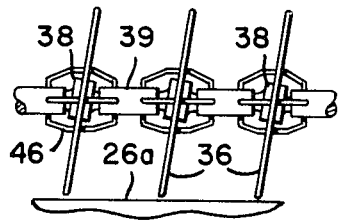
Figure 7:
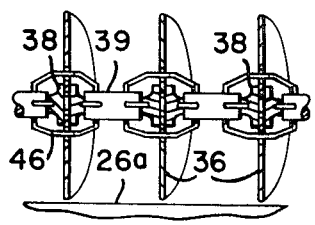
Figure 8:
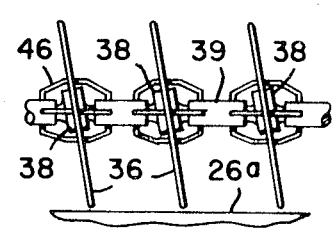
Figure 9:
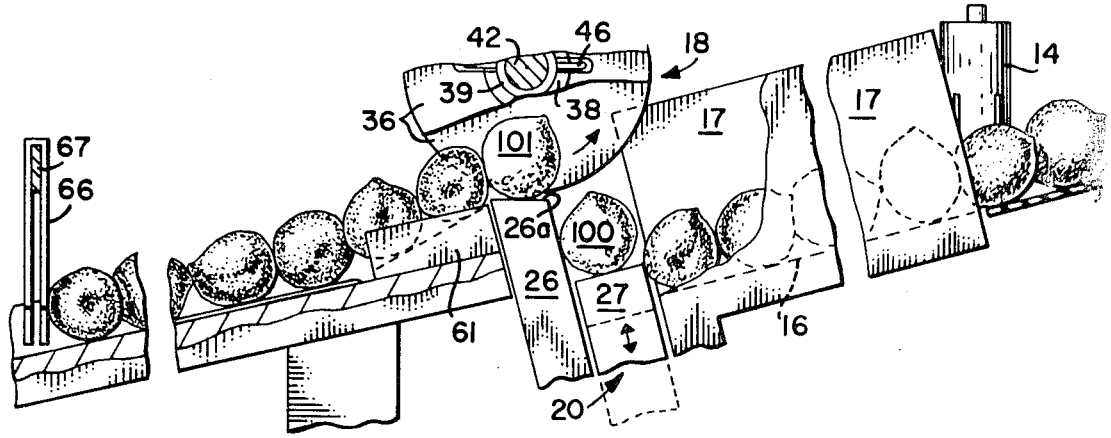
Figure 10:
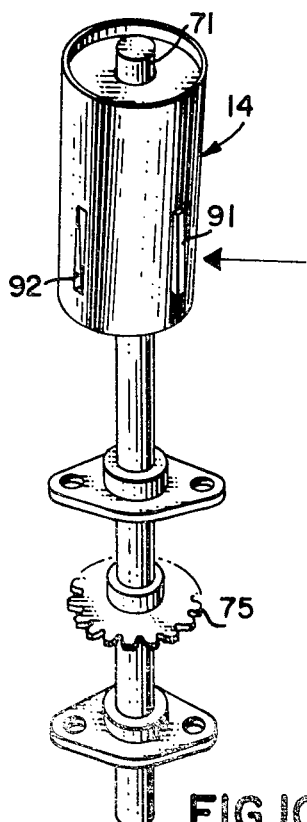

FIGS. 6, 7, and 8 are schematic views illustrating different positions of the wobble plate feed and control mechanism;

FIG. 9 is a schematic sectional view similar to FIG. 4, illustrating the operation of the fruit feed system;

FIG. 10 is a perspective detail view of one of the antibridging elements; and

Figure 11:
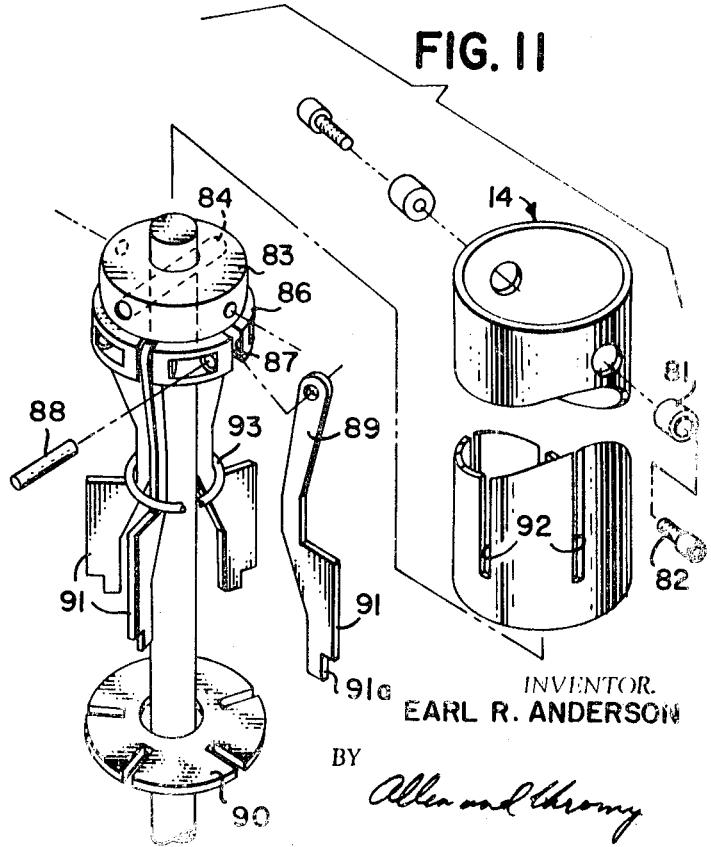

FIG. 11 is a perspective exploded view of one of the antibridging elements; and

FIG. 12 is a schematic view of a modified wobble plate control.

Referring to FIG. 1, the fruit feed system includes a bulk feed mechanism 10 of the "merry-go-round" type, having a feed conveyor 11 with its upper active stretch moving in the direction of the arrow in FIG. 1 and maintained in slanted condition toward the retaining wall 12 at one side of the conveyor, and a feed opening 13 is provided therein between two antibridging rollers 14, referred to more particularly hereinafter, and leading to an inclined hopper 16 between respective sidewalls 17. A return conveyor 15 is also provided.

From the inclined fruit hopper 16 there is provided a fruit elevating mechanism 20, referred to in more detail hereinafter, a fruit admitting and rejecting mechanism 18, and a plurality of single-file feed mechanisms 19 from the lower end of which the fruit is discharged, fruit by fruit, by an elevating fruit discharge mechanism 21, also referred to in greater detail hereinafter.

Referring to FIGS. 1 and 4, the fruit row lifting mechanism 20 for feeding fruit from the hopper 16 to the fruit receiving and rejecting mechanism 18 comprises a fixed fruit support member 26, which is disposed in a position inclined toward the discharge end of the apparatus and has a fruit-supporting top surface 26a which is shown as substantially horizontal, but which may also be inclined toward the discharge end or toward the single-file feed trough to enhance gravity flow of the fruit. The width of the front support or top surface 26a is such that only a single fruit row can be supported thereon. Cooperating with the fruit support member 26 is a fruit row lifting bar 27 mounted for reciprocation along an inclined path parallel to the support member 26 and shown in dotted lines at its lowest position in FIG. 9. The member 27 is shown in full lines in intermediate position in FIG. 9 when it has just lifted a row of fruit from the hopper 16, and is shown at its upper position in FIG. 4 where it has elevated the row of fruit in cooperation with the fruit admitting and rejecting mechanism 18. The top surface of the lifting bar 27 is of a width also to lift only a single fruit row. The fruit elevating bar or member 27 is driven by a harmonic drive mechanism 28 and is mounted for sliding movement on a pair of supports 29, each having a slot 30 therein. Only one member 29 is shown. The drive mechanism 28 is driven by a suitable chain and sprocket mechanism from a variable speed motor 32. This harmonic drive mechanism is of the type shown in my copending application Ser. No. 560,966 filed June 22, 1966 for FEEDING OF FRUIT AND VEGETABLE ARTICLES.

As explained above, the width of the feed bar 27 is so selected with respect to the size of the fruit being handled that it will only present a single row of fruit to the fruit admitting and rejecting mechanism 18, and if no fruit is to be admitted, the fruit will again be lowered with the bar 27 down to the level of the hopper 16, then represented upon the next lifting movement of the bar 27.

Figure 5:
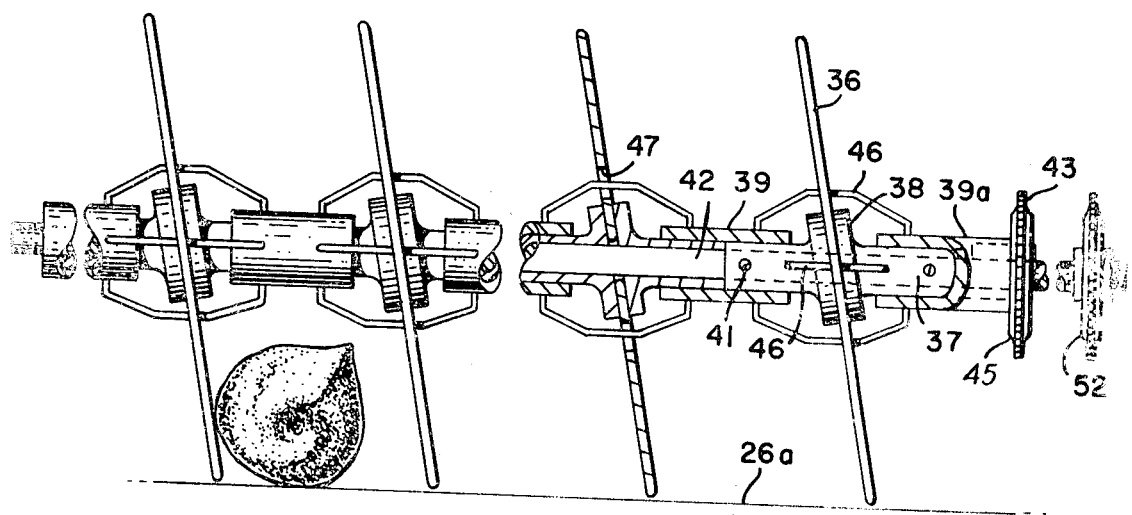
FIG. 5 is a horizontal sectional view with certain parts shown in elevation, the view being taken as indicated by the line 5—5 in FIG. 1.

The automatic fruit admitting and rejecting mechanism comprises a series of wobble disks or plates 36 (FIGS. 1, 4, and 5), each of which is mounted for rotative and tilting movement between two control sleeves 37, having oblique flanges 38 at their ends adjacent each wobble disk 36 so as to control and determine the oblique angle of the disk during rotation thereof about the coinciding axes of the shaft 46 and the sleeves 39. The drive for the wobble disks 36 themselves comprises a series of sleeves 39 which are joined by bent rods 46 extending therebetween and through driving apertures 47 in the wobble disks or plates. The endmost sleeve 39a, as seen in FIG. 5, is connected to a sprocket 45 which has a chain and sprocket drive 43 (FIG. 1) to a variable-speed motor 44. The plane of rotation-defining sleeves 37 are secured by setscrews 41 to the mounting shaft 42 about which the wobble disks revolve, and this shaft 42 has at one end a drive sprocket 51 forming part of a chain and drive sprocket connection 52 to a variable-speed motor 53. From the above description it will be seen that the series of sleeves 39 and 39a are joined by the bent rods 46 to provide a first drive assembly to rotate the wobble plates 36 about the coinciding axes of the sleeves 39 and the shafts 42 so that these plates or disks rotate with respect to the control flanges 38. The rotation of the first drive assembly is with respect to a second drive assembly including the shaft 42 to which the sleeves 37 are secured.

Referring to FIGS. 6, 7, and 8, selected positions of the wobble plates during their rotation are shown, FIGS. 6 and 8 showing the extreme amounts of the wobble with respect to the fruit support surface 26a and FIG. 7 showing the plates standing vertically with respect to the surface 26a. Referring to FIG. 7 it will be noted that the wobble plates 36 are shown in section and in a vertical plane, the front half of the wobble plate being omitted to emphasize the perpendicular relation of the plates to the fruit supporting surface 26a. The wobble of the disks 36 provides a back and forth movement of the part of the disks which are adjacent to the surface 26a so that any article between these disks is rolled back and forth as it is engaged by a respective adjacent pair of disks 36. By controlling the relative speed of rotation of the wobble plates 36 with respect to the speed of rotation of and their control members 38 rotating with the shaft 42, the frequency of wobble with respect to front support surface 26a can be controlled. For certain applications the wobble plates may be fixed to the supporting shaft with a desired oblique position.

The operation of the series of wobble plates FIG. 9 with respect to fruit presented thereto by the feed bar 27 is such that due to their direction of rotation, any fruit which is encountered by the periphery of the wobble plates 36 due to the rotation of the wobble plates will be discharged back into the feed trough 16. Any fruit which is substantially centered with respect to the two adjacent wobble plates will not be knocked off but will be admitted and fed to the surface 26a by gravity movement and will then be maintained in agitated condition on the support 26 which is elevated both with respect to the trough 16 and the single-file feed mechanisms 19.

From the elevated fruit support 26a (FIG. 9), the agitated fruit will roll down a V-shaped feed block 61 to a feed trough formed by inclined sidewalls 62 of a character disclosed in said application. The feed trough walls 62 are separated at the bottom to provide a slot in which an agitating belt 63 is mounted, which, as described in said application, operates with its upper stretch moving in a reverse direction to the flow of the fruit so as to separate a group of the fruit from a feeding group at the bottom of the trough, as disclosed in said application. From the feeding group, the fruit is lifted one for one by the elevating blades 64 of a fruit discharge mechanism 21, which is of the character disclosed in said application, and fed to a suitable pocketed conveyor or the like for transmission to a processing mechanism.

Means is provided for interrupting the feed of fruit in any trough and this means comprises a stop member 66 which has a contour at the bottom to fit in the trough and is U-shaped in construction to fit over a mounting bar 67 which extends across the various single-file fruit feed mechanisms and is supported by suitable standards 68 on the sides 69 of the single-file feed mechanism.

Referring to FIGS. 1, 2, 10, and 11, the antibridging elements 14 are shown as mounted on respective shafts 71, journaled in respective U-shaped brackets 72 and 72a. The bracket 72 is connected to and mounted on the adjustable slide plate 73 so that the position of the right-hand antibridging element 14 can be adjusted and the width of the feed opening can be varied. The left-hand antibridging element has its shaft 71 mounted in fixed bracket 72a. Both of the antibridging elements 14 are driven by suitable drive means and can operate in either direction. The interconnecting drive means comprises a chain 74 engaging respective sprockets 75 on the shafts 71 and a takeup sprocket 76 mounted in a slotted bracket 78 so that it can be adjustably clamped in any desired position along the slot of the bracket 78 as the right-hand antibridging element is moved in and out to change the size of the fruit-admitting opening 13. A slot 79 in the bottom of the hopper 16 provides for this adjustment.

Each antibridging element 14 comprises a cylinder (FIGS. 10 and 11) which is pivotally mounted adjacent the top by a pair of bushings 81 secured by screws 82 to a head 83 so that the cylinder comprising the antibridging element 14 is free to pivot about this axis. The head or plate 83 is pivotally mounted about a pin 84 passing through the shaft 71 and thus provides a limited universal mounting for the antibridging cylinder 14 at its top on the shaft 71. The bottom portion of the plate 83 is enlarged and has a series of vertical slots 87 around its periphery to receive a pivot pin 88 for a depending lever 89 which is enlarged at its lower end to provide a projecting surface 91 which engages in a corresponding slot 92 in the wall of the cylinder 14. The lower end 89a of each lever 89 engages in a slot 94 of a plate 95 and is adapted to engage a portion of the cylinder to limit the amount of projecting movement. The plurality of levers 91 are encircled by a resilient O-ring 93 by which they are yieldably retained in a centralized position on the shaft 71.

If bridging occurs whereby pressure is put on the lower end of an antibridging element or cylinder 14, this lower end will tilt as shown in FIG. 10, causing the antibridging drive elements 91 to project beyond the periphery of the cylinder 14 at this point and impact the fruit to break up any such bridge.

The operation of the system will be described in connection with peaches, as shown in the schematic view in FIG. 9. In this view an ample supply of peaches 100 is shown in the supply hopper 16 and one row of such peaches 100 is shown on the elevating member 27, having been separated from the bulk supply in the hopper 16 to be presented for feeding onto the support surface 26a. It will be obvious from the counterclockwise direction of rotation of the wobble disks 36 that any peach on the lifting bar 27 which is encountered by these disks will be ejected and forced back into the hopper 16. Also, any peach which happens to be centered with respect to a pair of the wobble plates 36 and encounters a peach 101 on the support surface 26a merely rides up and down with the bar 27 or else is forced off of the lift bar 27. In this view, the peaches have been blocked by the stop member 66 so that there is a continuous file up the trough 21 over the discharge member 61 up to and on the support surface 26a. In effect, a pair of wobble plates 36, the fruit support surface 26a and the lift bar 27 form a fruit control gate which only passes fruit on demand. At the same time all of this file of peaches is being maintained "live" by agitation and ready to feed when the blocking member 66 is removed. When this member is removed, the peach 101 will be fed off the support 26a and the next time the lift bar rises, a peach from it will be fed to continue the flow of peaches for discharge in article by article fashion.

Referring to FIG. 12, there is shown schematically a means for varying the amount of wobble of the wobble plates 36 with respect to the fruit support surface 26a by effecting an oscillatory drive of the shaft 42 to which their control elements 38 are secured. Secured to the shaft 42 is a depending slotted arm 183 to which an actuating arm 182 is partially secured by clamp means 184. The actuating arm 182 is pivoted to a disk 181 carried by the shaft of the motor 153. By varying the point of connection of the actuating arm 182 to the slotted arm 183, a desired amount of oscillation can be imparted to the shaft 42 and the oblique control members 38 for the wobble disks 36. Preferably, the oscillation is equal in both directions from the position of the disks 36 shown in FIG. 7.

While I have shown and described a preferred apparatus and method for carrying out this invention, it is apparent that the invention is capable of variation and modification of the form shown so that the scope thereof should be limited only by the proper scope of the claims appended hereto.

What I claim is:

1. In a fruit feed system, means providing a supply of fruit in bulk, a single-file feed mechanism, a fruit support between said single-file feed mechanism and said bulk supply means, movable fruit admitting and rejecting mechanism disposed in cooperative relation with said fruit support, means for operating said fruit admitting and rejecting mechanism, and means for presenting fruit from said supply means to said fruit support, said fruit admitting and rejecting mechanism operating to admit properly centered fruit to said fruit support and having movable means to reject fruit which is not properly centered with respect to said single-file feed mechanism.

2. In a fruit feed system as recited in claim 1 in which the fruit support is in elevated position with respect to the discharge portion of said supply means and in which the fruit-presenting means elevates a row of fruit from the supply means and presents it to said fruit support.

3. In a fruit feed system as recited in claim 1 which includes means for agitating fruit on said fruit support, and in which said agitating means and said fruit admitting and rejecting means comprises a pair of wobble plates mounted for rotation above said fruit support and spanning said fruit support for moving fruit back and forth on said support, the direction of rotation of said wobble plate means moving the bottom surface of said plates in direction to reject overfeed of fruit to said support.

4. In a fruit feed mechanism as recited in claim 3 in which means is provided for controlling the amount of wobble and the degree of agitation of fruit being fed between said wobble plates.

5. In a fruit feed system as recited in claim 2 in which blocking means is associated with said single-file feed mechanism to block feeding of fruit thereby, whereby fruit fed from the bulk supply backs up in said single-file feed mechanism and said agitating means and blocks further feeding from said bulk supply.

6. In a fruit feed system, means providing a supply of fruit in bulk, a plurality of parallel single-file feed mechanisms each having an elevated fruit-admitting end, a common fruit support extending across the elevated fruit-admitting ends of said single-file feed mechanisms, movable fruit admitting and rejecting mechanisms providing a plurality of feed lanes across said support and leading respectively to said feed mechanisms, means for operating said fruit admitting and rejecting mechanisms, and means for moving and presenting a row of fruit from said bulk supply means to said fruit support for feeding thereto.

7. In a fruit feed system as recited in claim 6 in which said fruit support is elevated with respect to the discharge portion of said supply means in which said presenting means comprises elevating means.

8. In a fruit feed system as recited in claim 6 in which said fruit admitting and rejecting mechanism comprises a series of wobble plates mounted in oblique relation to said shaft and for rotation above said fruit support, each opening between adjacent wobble plates being aligned with one of said single-file feed mechanisms, whereby fruit elevated and presented to said fruit support will be moved back and forth on the support and thereby agitated while on the support in the course of being fed to said single file feed mechanisms.

9. A method of feeding rollable fruit articles on demand from a bulk supply of fruit to a single file of fruit articles, which comprises providing a path leading from the bulk supply to the single file of fruit, isolating a row of fruit by lifting a row of fruit from the bulk supply and presenting it to the single-file portion of the feed path, said row being in excess of the number required for feeding, rejecting excess articles from said row while leaving a properly centered article for feeding to said single-file portion of the path.

10. In a method of feeding fruit articles as recited in claim 9, which includes the step of interrupting the feeding of fruit articles along said single-file portion of said path and thereby causing articles to accumulate in said single-file and at the entrance to said single-file path, and utilizing the article at the entrance portion of said single-file path to reject further feeding of articles from said isolated row.

11. A method of feeding rollable fruit articles on demand from a bulk supply of fruit to a plurality of single-files of fruit articles, which comprises providing a plurality of single-file feed paths leading from the bulk supply, isolating a row of fruit from said bulk supply and presenting it as a row for feeding to the entrance portions of said single-file feed paths, rejecting excess fruit from said row, and admitting a properly centered fruit with respect to each of said single-file paths which includes interrupting the feeding of articles along one of said single-file paths, and thereby causing articles to accumulate in said single-file backwardly up to the entrance portion thereof, utilizing the endmost article at the entrance portion to block further feed of articles from said supply to said interrupted single-file path, and continuing the feed of articles to uninterrupted feed paths.

* * * * *